United States Patent
Shelly et al.

(10) Patent No.: US 7,036,770 B2
(45) Date of Patent: May 2, 2006

(54) METHODS AND APPARATUS FOR ILLUMINATION OF REFUELING HOSES

(75) Inventors: Mark A. Shelly, Bel Aire, KS (US); Theron L. Cutler, Wichita, KS (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/627,453

(22) Filed: Jul. 25, 2003

(65) Prior Publication Data

US 2005/0017130 A1    Jan. 27, 2005

(51) Int. Cl.
B64D 39/04    (2006.01)
(52) U.S. Cl. .................................................. 244/135 A
(58) Field of Classification Search ............ 244/135 R, 244/135 A, 1 R; 362/556
See application file for complete search history.

(56) References Cited

U.S. PATENT DOCUMENTS

| | | | |
|---|---|---|---|
| 3,285,544 A * | 11/1966 | Chope et al. ............ | 244/135 A |
| 3,913,625 A | 10/1975 | Gazda et al. | |
| 4,140,937 A * | 2/1979 | Vecht et al. ................. | 313/503 |
| 4,398,685 A | 8/1983 | Task et al. | |
| 4,633,376 A | 12/1986 | Newman | |
| 4,644,895 A * | 2/1987 | Cozad ......................... | 116/200 |
| 4,763,861 A | 8/1988 | Newman | |
| 5,063,607 A | 11/1991 | FitzHenry et al. | |
| 5,247,190 A * | 9/1993 | Friend et al. .................. | 257/40 |
| 5,326,052 A * | 7/1994 | Krispin et al. .......... | 244/135 A |
| 5,333,639 A * | 8/1994 | Nelson ........................ | 137/150 |
| 5,539,624 A | 7/1996 | Dougherty | |
| 5,573,206 A | 11/1996 | Ward | |
| 5,872,595 A | 2/1999 | Monahan | |
| 5,982,424 A | 11/1999 | Simerly et al. | |
| 5,996,939 A | 12/1999 | Higgs et al. | |
| 6,085,698 A * | 7/2000 | Klein ......................... | 119/859 |
| 6,137,533 A | 10/2000 | Azim | |
| 6,252,536 B1 | 6/2001 | Johnson et al. | |
| 6,257,750 B1 * | 7/2001 | Strasser et al. ............. | 362/559 |
| 6,366,367 B1 | 4/2002 | Schreier et al. | |

FOREIGN PATENT DOCUMENTS

EP    0126306    11/1984

OTHER PUBLICATIONS http://www.unitika.co.jp/e/object/kino/02.htm Unitika Ltd., "Advanced materials: Glass Fibers With Orginal Functions Enable a Wealth of Applications" Jul. 10, 2003, pp. 1-3.
http://www.unibeads.com/p044.html Union Co., Ltd., Business Activities; Manufacture and Sales of Glass Beads, Jul. 10, 2003, 1 pg.

* cited by examiner

Primary Examiner—Galen Barefoot
(74) Attorney, Agent, or Firm—Lee & Hayes, PLLC

(57) ABSTRACT

Methods and apparatus for illumination of aerial refueling hoses are disclosed. In one embodiment, a conduit for transferring a flowable material includes a wall member. A plurality of optical fibers are at least one of formed within an outer layer of the wall member and disposed on an outer surface of the wall member. A light emitted by the optical fibers illuminates the conduit. In an alternate aspect, the optical fibers may be replaced with a luminescent outer portion. The luminescent outer portion may include an electromagnetic substance, a phosphor substance, an ultraviolet-energized material, or any other suitable material.

18 Claims, 2 Drawing Sheets

METHODS AND APPARATUS FOR ILLUMINATION OF REFUELING HOSES

FIELD OF THE INVENTION

The present invention relates to methods and apparatus for illumination of refueling hoses, including, for example, refueling hoses for aerial refueling systems and the like.

BACKGROUND OF THE INVENTION

Aerial refueling is commonly employed to increase the range and flight duration of an aircraft. Some types of aerial refueling systems include a hose having a drogue attached thereto which trails or drags behind a fuel tanker. On the end of the hose is a "basket" which includes a reception coupling. The receiver aircraft includes a probe (or fuel inlet) that may be fixed or retractable. When the receiver aircraft needs to be aerial refueled, it approaches the tanker and then flies formation on the trailing aerial refueling hose, slowly approaching the reception coupling. Eventually the receiving aircraft "stabs" or engages the probe into the reception coupling, thereby providing a connection for transferring fuel between the tanker and the receiver aircraft. Known hose and drogue aerial refueling systems include, for example, those systems disclosed by U.S. Pat. No. 5,573,206 issued to Ward, and U.S. Pat. No. 5,539,624 issued to Dougherty.

Typically, in order to initiate the tanker refueling pumps to commence the fuel transfer from the tanker to the receiver aircraft, the receiver aircraft must engage the probe into the refueling hose coupling and push the hose in past the outer refueling limit. The receiver can push beyond the minimum to receive fuel from the tanker. Fuel flow will continue as long as the receiver aircraft keeps the hose in the "refueling envelope". Typically the receiver aircraft pushes to a range, somewhere in the middle of the refueling envelope. If the receiver aircraft pushes the hose in to the inner refueling limit, the tanker fuel system will shut down, ceasing full transfer to the receiver aircraft. If the receiver aircraft pulls out to where it is back in the refueling envelope, fuel transfer will reinitiate. Upon completion of the refueling process, the receiver aircraft continues to back out until the tanker hose is fully deployed. At this point, if the receiver aircraft backs out further, the connection between the tanker reception coupling and the receiver aircraft probe is released. During this whole process, as the receiver aircraft pushes and pulls on the hose, the tanker hose reel system winds and unwinds the hose on a tanker mounted hose reel to keep the slack out of the hose.

Although desirable results have been achieved using prior art aerial refueling systems, some drawbacks have been noted. For example, during some operating conditions, the refueling hose may be difficult for the personnel on board the receiver aircraft to see. Glints, shadows and glare caused by the sun, atmospheric water vapor, or reflections from aircraft surfaces may hamper visibility of the refueling hose during daylight operations. Similarly, darkness or relatively low lighting conditions may obscure visibility of the refueling hose during nighttime operations. Thus, there exists a need for an improved aerial refueling system that reduces adverse viewing conditions and improves the ability of the personnel on the receiver aircraft to view the refueling hose during varying lighting conditions.

SUMMARY OF THE INVENTION

The present invention is directed to methods and apparatus for illumination of refueling hoses, including, for example, refueling hoses for aerial refueling systems. Apparatus and methods in accordance with the present invention may advantageously provide improved visibility of refueling hoses for aerial refueling operations during nighttime operations without requiring additional moving parts. Thus, the efficiency, safety, and reliability of nighttime aerial refueling operations may be improved.

In one embodiment, a conduit for transferring a flowable material includes a wall member at least partially enclosing an inner region, the inner region being adapted to receive the flowable material and to facilitate transfer of the flowable material from a first location to a second location. A plurality of optical fibers are at least one of formed within an outer layer of the wall member and disposed on an outer surface of the wall member. The optical fibers are adapted to emit light outwardly therefrom, thereby illuminating the conduit.

In another embodiment, a conduit for transferring a flowable material includes a wall member at least partially enclosing an inner region adapted to receive the flowable material and to facilitate transfer of the flowable material from a first location to a second location. The wall member includes a luminescent outer layer being at least one of integrally formed with the wall member and disposed on an outer surface of the wall member, the luminescent outer layer being adapted to emit light outwardly therefrom to illuminate the conduit.

BRIEF DESCRIPTION OF THE DRAWINGS

The preferred and alternative embodiments of the present invention are described in detail below with reference to the following drawings.

DETAILED DESCRIPTION OF THE INVENTION

The present invention relates to methods and apparatus for illumination of refueling hoses. Many specific details of certain embodiments of the invention are set forth in the following description and in FIGS. 1–6 to provide a thorough understanding of such embodiments. One skilled in the art, however, will understand that the present invention may have additional embodiments, or that the present invention may be practiced without several of the details described in the following description.

Figure 1:
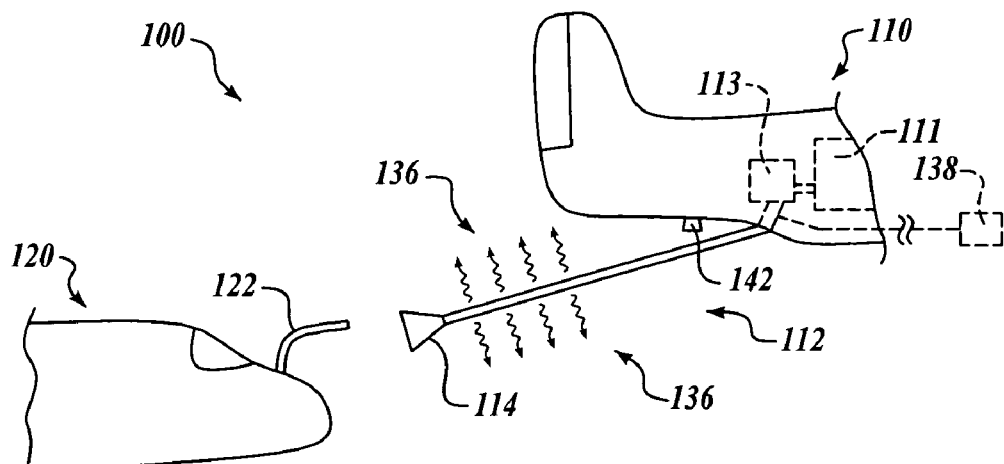
FIG. 1 is a side elevational view of an aerial refueling system in accordance with an embodiment of the present invention.

FIG. 1 is a side elevational view of an aerial refueling system 100 in accordance with an embodiment of the present invention. In this embodiment, the aerial refueling system 100 includes a tanker aircraft 110 having a refueling hose 112, along with a fuel tank 111 and a pump 113 to enable the delivery of fuel. A basket (or drogue) 114 is coupled to the end of the refueling hose 112. As further shown in FIG. 1, a receiving aircraft 120 having a fuel receptacle or probe 122 may be flown proximate to the tanker aircraft 110. In operation, the probe 122 may be inserted into the refueling hose 112 so that fuel may be transferred through the hose 112 into the probe 122 and into the receiving aircraft 120.

Figure 2:
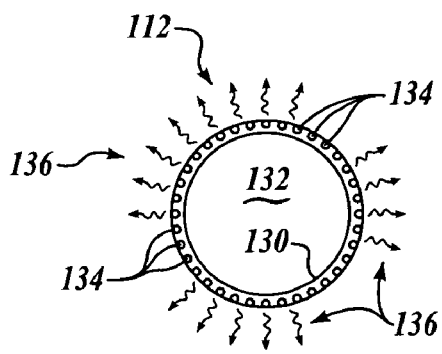
FIG. 2 is an enlarged cross-sectional view of a refueling hose of the aerial refueling system of FIG. 1 in accordance with an embodiment of the present invention.

FIG. 2 is an enlarged cross-sectional view of the refueling hose 112 of the aerial refueling system 100 of FIG. 1 in accordance with an embodiment of the present invention. The refueling hose 112 includes a wall member 130 substantially enclosing an interior region 132. A plurality of fiber optic strands (or optical fibers) 134 are disposed within an outer portion of the wall member 130 so that light 136 emitted outwardly from the fiber optic strands 134 may be visible from the surrounding environment outside the wall member 130. In one aspect, the fiber optic strands 134 may be impregnated in the final lay-up of the refueling hose 132 during fabrication. Alternately, the fiber optic strands 134 may be attached to the outside of a pre-existing refueling hose using a suitable adhesive or other suitable attachment mechanism or device. An illumination control system 138 may be positioned within the tanker aircraft 110 and operatively coupled to the plurality of fiber optic strands 134, thus allowing the illumination and intensity of the fiber optic strands 134 to be controllable from the tanker aircraft 110. In one particular aspect, all portions of the refueling hose 112, including the basket 114, may be equipped with fiber optic strands 134. In alternate aspects, only certain portions of the refueling hose 112 may be equipped with fiber optic strands 134, including, for example, longitudinal strips, circumferential bands, or any other desired portions of the refueling hose 112.

In operation, the refueling hose 112 may advantageously provide improved visibility during night operations. As the receiver aircraft 120 is moved into position for aerial refueling, the refueling hose 112 may be energized using the illumination control system 138 in the tanker aircraft 110, causing the refueling hose 112 to emit light 136 and improving the visibility of the refueling hose 112 for personnel on board both the receiver aircraft 120 and the tanker aircraft 110. Thus, the refueling hose 112 advantageously improves visibility of the refueling hose 112 during night operations in comparison with prior art hoses.

Furthermore, the refueling hose 112 provides other advantages over alternate methods of hose illumination. For example, embodiments of refueling hoses in accordance with the present invention rely on relatively simple, proven fiber optic technology, with essentially no additional moving parts. Thus, the cost and complexity of the device is relatively low, and the reliability is increased, compared with alternate methods of illumination.

It will be appreciated that embodiments of apparatus and methods in accordance with the present invention may be employed in conjunction with a wide variety of tanker and receiver aircraft. For example, the tanker aircraft 110 may be any desired tanker aircraft, including, for example, a 767 Global Tanker Transport Aircraft (manufactured by The Boeing Company of Chicago, Ill.), a French C-135FR aircraft, a USAF KC-135R aircraft, a KC-10A aircraft, a C-130 aircraft, U.S. Navy Buddy Refueling stores, or any other suitable aircraft, including other types of aircraft, such as rotary aircraft, or other manned and unmanned military aircraft, including those described, for example, in The Illustrated Encyclopedia of Military Aircraft by Enzo Angelucci, published by Book Sales Publishers, September 2001, and incorporated herein by reference. Similarly, the receiver aircraft may generally be any suitable model or type of aircraft, including a fighter aircraft, a reconnaissance aircraft, a bomber aircraft, or any other suitable aircraft. The various components and subsystems of the tanker and receiver aircraft that are unrelated to the present invention and that enable these aircraft to operate are of generally known construction and, for the sake of brevity, will not be described in detail herein. Generally, the tanker and receiver aircraft 110, 120 may include one or more propulsion units coupled to a fuselage, a wing assembly (or other lifting surfaces), a tail assembly, a landing assembly, a control system, and may also include other systems and subsystems that enable proper operation of the aircraft, as shown and described in the above-referenced publication.

It will also be appreciated that a variety of alternate embodiments of the present invention may be conceived in accordance with the teachings herein, and that the present invention is not limited to the particular embodiment described above and shown in FIG. 1. Several representative alternate embodiments are described below with reference to FIGS. 2–6. The following discussion of alternate embodiments is not intended to be an exhaustive list of all alternate embodiments, but rather, is provided to merely demonstrate a few of the multitude of possible embodiments that may be conceived in accordance with the teachings herein. In the following discussion, similar components will be assigned similar reference numerals. For the sake of brevity, only significant differences or features of each additional embodiment will be described in detail.

Figure 3:
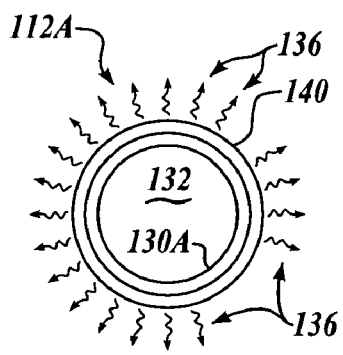
FIG. 3 is an enlarged cross-sectional view of a refueling hose of the aerial refueling system of FIG. 1 in accordance with another embodiment of the present invention.

FIG. 3 is an enlarged cross-sectional view of a refueling hose 112A of the aerial refueling system 100 of FIG. 1 in accordance with an alternate embodiment of the present invention. In this embodiment, the wall member 130A of the refueling hose 112A includes a luminescent outer layer 140. In one particular aspect, the luminescent outer layer 140 includes an electroluminescent material (e.g. electroluminescent paint) that gives of the emitted light 136 when charged by electricity using the illumination control system 138 (FIG. 1). The electroluminescent material may, for example, be applied during the final hose lay-up during manufacture. Alternately, the electroluminescent material may be applied or otherwise attached to the outside of a pre-existing refueling hose. The intensity of the light 136 from the electroluminescent material in the outer layer 140 may be controlled by the illumination control system 138 from within the tanker aircraft 110. Thus, the above-noted advantages of aerial refueling systems in accordance with the present invention may be achieved with refueling hoses 112A having the luminescent outer layer 140 that includes an electroluminescent material.

In an alternate aspect, the luminescent outer layer 140 includes a phosphor substance that radiates light 136 after being energized. The phosphor substance may, for example, be energized by a light source. In one particular embodiment, the phosphor substance in the luminescent outer layer 140 of the refueling hose 112A may be energized by a tunnel light 142 where the refueling hose 112A exits the tanker aircraft 110 (FIG. 1). As the refueling hose 112A is released outwardly from the tanker aircraft 110, the phosphor substance may be charged and illuminated as it trails behind the tanker aircraft 110. In operation, if the luminescence of the phosphor substance wanes below an acceptable level, the refueling hose 112A may simply be rewound into the tanker aircraft 110 and extended back out to the trailing position behind the tanker aircraft 110. Although the refueling hose 112A including the phosphor substance may operate during any low lighting conditions, it may operate best during very low lighting conditions. Therefore, the above-noted advantages of aerial refueling systems in accordance with the present invention may be achieved with refueling hoses 112A having the luminescent outer layer 140 that includes a phosphor substance.

In yet another alternate aspect, the luminescent outer layer 140 may include an ultraviolet-energized substance that radiates light 136 after being energized by exposure to an ultraviolet light. This embodiment may be suitable for use with, for example, Night Vision Goggles (NVG). Substances that may be energized by ultraviolet light include, but are not limited to, various phosphor substances. The luminescent outer layer 140 containing the ultraviolet-energized substance may be energized by an ultraviolet light source positioned on either the tanker aircraft 110, the receiver aircraft 120, or both (e.g. by an ultraviolet tunnel light 142). In addition to the above-noted advantages, the luminescent outer layer 140 that includes an ultraviolet-energized substance may provide an additional advantage that the ultraviolet light used to energize the refueling hose 112A may be much less visible from the ground or from other aircraft alternate apparatus that utilize visible light to illuminate and energize the refueling hose.

Figure 4:
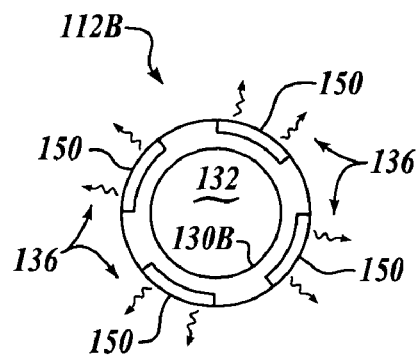
FIG. 4 is an enlarged cross-sectional view of a refueling hose of the aerial refueling system of FIG. 1 in accordance with yet another embodiment of the present invention.

FIG. 4 is an enlarged cross-sectional view of a refueling hose 112B of the aerial refueling system 100 of FIG. 1 in accordance with yet another embodiment of the present invention. In this embodiment, the wall member 130B includes a plurality of luminescent outer portions 150. Similar to the luminescent outer layer 140 described above the luminescent outer portions 150 may include, for example, an electroluminescent material, a phosphor substance, an ultraviolet-energized substance, or any other suitable luminescent material. Each of the luminescent outer portions 150 may emit light 136 to provide improved visibility of the refueling hose 112B. It will be appreciated that the luminescent outer portions 150 may be distributed over the wall member 130B in any suitable distribution or pattern, including for example, longitudinal stripes, spiral or helical stripes, patches, checkerboard patterns, or any other desired distribution or pattern.

Figure 5:
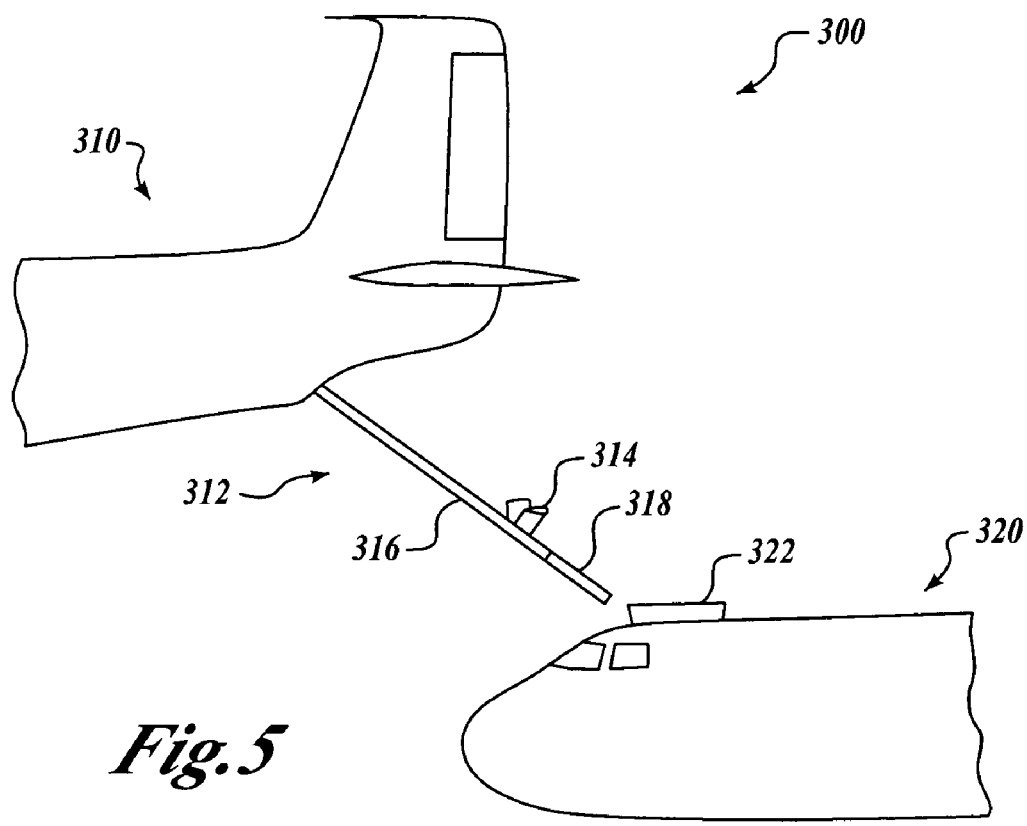
FIG. 5 is a side elevational view of an aerial refueling system in accordance with another alternate embodiment of the present invention.

It will be appreciated that the embodiments of apparatus and methods of illuminating refueling hoses is not limited to the particular embodiments of hose-and-drogue aerial refueling systems described above and shown in FIG. 1. For example, FIG. 5 is a side elevational view of an aerial refueling system 300 in accordance with another alternate embodiment of the present invention. In this embodiment, the tanker aircraft 310 includes a refueling boom 312 that extends downwardly to engage with a fuel receptacle 322 of the receiving aircraft 320. The refueling boom 312 may include airfoils surfaces 314 extending outwardly therefrom to provide aerodynamic control of the position of the boom 312. As described above with respect to the refueling hose 112, the refueling boom 312 includes a first portion 316 and a second portion 318. At least one of the first and second portions 316, 318 may be provided with a luminescent outer layer 140, luminescent outer portions 150, or both, as described above with respect to the refueling hoses 112 shown in FIGS. 1–4. Thus, the above noted advantages of the present invention may be achieved in an aerial refueling system that employs a refueling boom rather than a hose and drogue combination.

Figure 6:
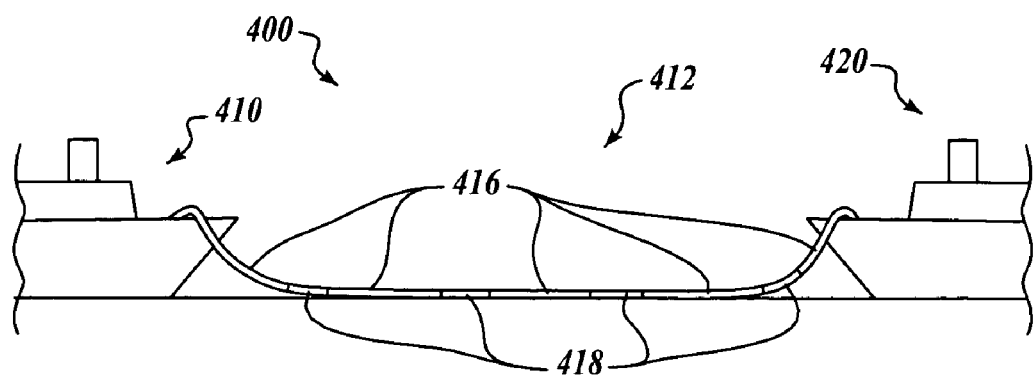
FIG. 6 is a side elevational view of a material transfer system in accordance with still another embodiment of the present invention.

Similarly, FIG. 6 is a side elevational view of a material transfer system 400 in accordance with still another embodiment of the present invention. In this embodiment, the system 400 includes a tanker vessel 410, a receiving vessel 420, and a transfer conduit 412 engaged therebetween. In one aspect, the transfer conduit 412 may be at least partially buoyant so that the transfer conduit 412 will float on a body of water between the tanker and receiving vessels 410, 420. The transfer conduit 412 includes a plurality of first portions 416 and a plurality of second portions 418. Again, at least one of the first and second portions 416, 418 may be provided with a luminescent outer layer 140, luminescent outer portions 150, or both, as described above with respect to the refueling hoses 112 shown in FIGS. 1–4. Thus, the above noted advantages of embodiments of the present invention may be realized in a material transfer system 400 particularly suited for transferring materials between ships. It is apparent that alternate embodiments in accordance with the teachings herein may be conceived for material transfer systems adapted for use between any desired types of vehicles or storage vessels, including trucks, automobiles, storage tanks, trains, spacecraft, and any other suitable vehicles or vessels.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

What is claimed is:

1. A conduit for transferring a flowable material, comprising:
    a wall member at least partially enclosing an inner region, the inner region being adapted to receive the flowable material and to facilitate transfer of the flowable material from a first location to a second location, the wall member including an electroluminescent coating disposed on an outer surface of the wall member, the electroluminescent coating being adapted to emit light outwardly therefrom, wherein the wall member includes at least one of a flexible aerial refueling hose arid a refueling boom.

2. The conduit of claim 1, wherein the electroluminescent coating comprises an electroluminescent paint.

3. The conduit of claim 1, wherein the wall member includes a cylindrical wall member.

4. An apparatus for transferring a flowable material, comprising:
    a tank adapted to contain a flawable material; and
    a conduit operatively coupled to the tank and adapted to receive the flowable material and to facilitate transfer of the flowable material between the tank and a second location, the conduit including a wall member and being adapted to receive the flowable material and to facilitate transfer of the flowable material from a first location to a second location, the wall member including an electroluminescent coating disposed on an outer surface of the wall member, the electroluminescent coating being adapted to emit light outwardly therefrom, wherein the conduit includes at least one of a flexible aerial refueling hose and a refueling boom.

5. The apparatus of claim 4, wherein the electroluminescent coating comprises an electroluminescent paint.

6. The apparatus of claim 4, wherein the conduit includes a cylindrical wall member.

7. The apparatus of claim 4, further comprising a pump operatively coupled to the tank and to the conduit and adapted to pump the flowable material from the tank to the conduit.

8. The apparatus of claim 4, further comprising an illumination control system operatively coupled to the plurality of optical fibers and adapted to control illumination of the plurality of optical fibers.

9. An aircraft, comprising:
   a fuselage;
   a propulsion system operatively coupled to the fuselage; and
   an aerial refueling system coupled to the fuselage and including:
      a tank adapted to contain a flowable material; and
   a conduit operatively coupled to the tank and adapted to receive the flowable material and to facilitate transfer of the flowable material between the tank and a second location, the conduit including a wall member and being adapted to receive the flowable material and to facilitate transfer of the flowable material from a first location to a second location, the wall member having an electroluminescent coating disposed on an outer surface of the wall member, the electroluminescent coating being adapted to emit light outwardly therefrom.

10. The aircraft of claim 9, wherein the electroluminescent coating comprises an electroluminescent paint.

11. The aircraft of claim 9, wherein the conduit includes a cylindrical wall member.

12. The aircraft of claim 9, wherein the conduit includes a flexible aerial refueling hose.

13. The aircraft of claim 9, wherein the conduit includes a refueling boom.

14. The aircraft of claim 9, further comprising a pump operatively coupled to the tank and to the conduit and adapted to pump the flowable material from the tank to the conduit.

15. The aircraft of claim 9, further comprising an illumination control system operatively coupled to the plurality of optical fibers and adapted to control illumination of the plurality of optical fibers.

16. A method of transferring a flowable material, comprising:
   providing a conduit operatively coupled to a tank containing the flowable material, the conduit being adapted to receive the flowable material and to facilitate transfer of the flowable material between the tank and a second location, the conduit including a wall member having an electroluminescent coating disposed on an outer surface of the wall member, wherein providing a conduit operatively coupled to a tank includes providing a conduit operatively coupled to a refueling tank of a tanker aircraft;
   illuminating the luminescent outer layer;
   emitting light outwardly from the electroluminescent coating; and
   transferring the flowable material through the conduit from the tank to the second location.

17. The method of claim 16, wherein providing a conduit having an electroluminescent coating disposed on an outer surface of the wall member comprises providing a conduit having an electroluminescent paint disposed on an outer surface of the wall member.

18. The method of claim 16, wherein transferring the flowable material through the conduit from the tank to the second location includes pumping the flowable material from the tank.

\* \* \* \* \*